3,088,834
THERMALLY DEVITRIFIABLE SEALING GLASSES
Perry P. Pirooz, Toledo, Ohio, assignor to Owens-Illinois Glass Company, a corporation of Ohio
No Drawing. Filed June 26, 1961, Ser. No. 119,315
2 Claims. (Cl. 106—53)

This invention relates to thermally devitrifiable sealing glasses. In a more specific aspects, the invention relates to thermally devitrifiable sealing glasses useful for relatively high temperature sealing, which glasses will undergo very little flow while being sealed in the devitrifiable state to a hard glass part or parts and yet will form a strong seal therewith.

In copending application Ser. No. 658,015, filed May 9, 1957, there are disclosed and claimed devitrifiable sealing glasses capable of making devitrified seals to compatible materials at temperatures of about 425° C. Such glasses are useful for sealing to hard glasses having coefficients of expansion from 0 to 300° C. in the range of about $80-120 \times 10^{-7}$. Such glasses are of importance in certain areas, for instance, in the sealing of color television bulbs and can withstand operating temperatures after devitrification in the neighborhood of the sealing temperatures of about 425° C. Sealing glasses said to have about the same uses and characteristics when devitrified are disclosed in Claypoole Patent 2,889,952, issued June 9, 1959. Glasses of similar composition and characteristics are also disclosed in Belgian Patent 576,999.

The foregoing glasses are not suitable for sealing to low expansion hard glasses having coefficients of expansion in the neighborhod of about $50 \times 10^{-7}$ over the range from 20–500° C. because of the incompatibility of the expansion coefficients. Moreover, such glasses flow quite readily at recommended sealing temperatures. There is a need for sealing hard glasses, especially those useful in electronic applications, which glasses have coefficients of expansion in the neighborhod of $50 \times 10^{-7}$ (20–500° C.). It is desired that such sealing glasses be capable of withstanding operating temperaures in use after devitrification of 650° C. or higher without disturbing the seal. Further, in certain applications it is highly desirable that the sealing glass has very little flow at the sealing temperature.

It is therefore an object of the present invention to provide devitrifiable glass compositions that can be devitrified at temperatures in the range from 675°–750° C. while exhibiting only a negligible flow during the devitrification period.

Other objects, as well as aspects and features, of the invention will become apparent from a study of the specification.

According to the present invention, the devitrifiable sealing glass compositions of the invention are compatible with materials having thermal expansion coefficients in the neighborhood of $50 \times 10^{-7}$, have a liquidus temperature above 2000° F., a fiber softening point above 600° C. but below 700° C. in the vitreous state, are capable of thermal devitrification within a period of 1 hour at a temperature within the range from 675–750° C. and consist essentially of 16–18 weight percent PbO, 12–15 weight percent $B_2O_3$, 48–52 weight percent ZnO, and 18–20 weight percent $SiO_2$.

In making a seal, say between two hard glass parts, one or both of the surfaces of the glass parts to be joined is coated with a powder or particulate sealing glass and the parts are brought together and heated until a seal is formed and the sealing glass is devitrified, and thereafter the parts are cooled. In this manner the seal is devitrified homogeneously throughout and not merely from the surface. For convenience, the powder is usually mixed with a liquid vehicle to form a paste. Such vehicles are well-known and include cellulose acetate, nitrocellulose and even water. In any case, the vehicle is one which is either evaporated or decomposed or both during the initial stages of the sealing process. For instance, a dilute solution of nitrocellulose in amyl acetate can suitably be employed.

As stated, the glasses of the invention are unusual in that a good seal can be formed to hard glasses even though the sealing glasses of the invention have very little flow at the sealing temperature during the sealing operation. This is important in certain electronic applications. For instance, microwave-guides made from a hard glass tube must have rather accurate dimensions. In making these wave-guides, a glass tube of the correct bore is sawed apart lengthwise to make two halves and the necessary metal electronic parts are inserted. Thereafter the solder glass is carefully applied to the edges of one of the halves and the two halves of the tube are placed together. It is important that the solder glass be just enough to replace the amount of hard glass lost in the sawing operation so that the tube retains its original circular shape and dimensions. The solder glass-hard glass combination is then carefully heated up to eliminate the binder for the solder glass and then heated up to its devitrification temperature where a seal is made and the devitrification takes place. With the present glass it is possible to make such a seal without obtaining oozing of the glass along the seal line. Such oozing would create an internal bead in the wave-guide, which cannot be tolerated. During the formation of the seal, since the powdered form of the solder glass is employed, a small amount of shrinkage of the solder glass takes place and this can be allowed for, but only a very insignificant flow will take place. The amount of flow of the solder glass, when making an actual seal, cannot be accurately or quantitatively measured, but a standard test is employed to indicate the flow of solder glasses during devitrification treatment. In such standard tests comparisons can be made between the amount of flow obtained wtih different solder glasses under stated conditions. Such a test will be described hereafter in more detail.

As has been recognized, it is difficult to determine the degree or amount of devitrification, in other words, the weight percent of the devitrified sealing glass that is in the crystalline form in such a devitrified glass, but in any case, the sealing glasses of the invention have at least a portion remaining in the vitreous state when heated under the devitrification conditions before mentioned. This glassy portion acts as a binder. The glasses of the invention are capable of an amount of devitrification under such devitrification conditions which makes the glass increase in viscosity. For any given glass, the amount of devitrification can be varied within limits by varying the time and temperature of the devitrification heat treatment, as will be understood.

*Example I*

In this example of the invention, a devitrifiable sealing glass, having a theoretical composition by weight of 17 percent PbO, 14 percent $B_2O_3$, 50 percent ZnO, and 19 percent $SiO_2$, was prepared by mixing 60.0 parts by weight lead silicate (85% PbO, 15% $SiO_2$), 48.0 parts by weight powdered flint (99.9% $SiO_2$), 42.8 parts by weight boric oxide, and 150.0 parts by weight zinc oxide to obtain a substantially homogeneous mixture and then melting the mixture in a furnace in a platinum container, the melting being conducted by heating at 2300° F. for 1 hour and then for 15 minutes at 2500° F. Thereafter the glass was poured out of the container and fritted in a conventional manner. This glass was found to have a coefficient of thermal expansion over the range from 20–500° C. of about $52 \times 10^{-7}$. When a sample of the glass was devitrified by treating the powdered glass by heating at the rate of 10° C. per minute to 700° C., and holding at that temperature for 1 hour and then cooling, the coefficient of thermal expansion over the same range was found to be about 43.5. However, the coefficient of expansion of the devitrified glass over the range from 20–503° C. was about 45.5. At a somewhat higher temperature, there is an even closer agreement between the coefficient of expansion of the vitreous and the devitrified sealing glass. The coefficient of expansion of the vitreous sealing glass within the range from 20–503° C. is unchanged, that is, it is also about $52 \times 10^{-7}$. This close agreement between the coefficient of expansion of the sealing glass in the vitreous state and in the devitrified state is an especially valuable feature since this tends to prevent trouble with tiny hairline cracks sometimes forming within the structure of a devitrified sealing glass because of the difference in the coefficient of expansion between the vitreous and crystalline phases.

It was found that the principal or primary crystalline phase of this glass was $Zn_2SiO_4$. The crystals are randomly disposed throughout the crystalline-glass mass. The glass had a fiber softening point of over 620° C. and a liquidus temperature of 2125° F.

Several seals were made with this glass, sealing the glass of the example to a planar surface of the hard glass part made from a silica-alumina-dolomite substantially identical with glass A of Table I in Patent No. 2,961,328. This hard glass has an annealing point temperature of about 775° C. and a coefficient of thermal expansion (20–500° C.) of about $48 \times 10^{-7}$. The sealing glass was crushed to a powder that passed 180-mesh screen and was then mixed with a vehicle comprising about 1 weight percent of nitrocellulose in amyl acetate, using enough of the vehicle to give a workable paste. The paste was then applied to the surface of the glass part, air dried and then fired, employing the heating schedule described in the specification. Seals were made using, respectively, sealing temperatures of 675° C., 700° C., 725° C., and 750° C. In each case the temperature was held during sealing and devitrification for 1 hour. The room temperature stresses in the devitrified seal so produced were, respectively, 800 p.s.i. compression, 350 p.s.i. compression, 150 p.s.i. tension, and 260 p.s.i. tension, all stresses being measured in the hard glass. During the sealing operation the mass of solder glass shrunk but there was scarcely any perceptible flow or spreading.

Similarly, a double seal was made, sealing two planar surfaces of hard glass parts together using the same hard glass and a sealing temperature of 700° C. for 1 hour. This produced a neutral seal with no significant stress in the hard glass.

*Example II*

Another sealing glass of the invention similar to the glass of Example I was prepared. Its composition was 12.3 weight percent $B_2O_3$, 17.3 percent PbO, 50.7 percent ZnO and 19.5 percent $SiO_2$. Strong seals were made between this glass and the hard glass described in Example I, using the same procedure there described and a sealing temperature of 700° C. The low flow of these glasses is demonstrated by the following test made on the present glass: Ten grams of the sealing glass, powdered to all pass 140 mesh, were compressed without any binding agent to make a cylinder ½″ in diameter and approximately 1″ high, using a pressure of 1000 p.s.i.g. The test cylinder was placed endwise on a glass substrate acting as a support, and was placed in an oven for devitrification heat treatment. The sample was heated at a rate of 10° C. per minute to 700° C., held at 700° C. for 1 hour, and then cooled at a rate of about 5° C. per minute. Ordinarily in this test, most suitable sealing glasses that will form a good bond to a hard glass will slump and flow out to form a circular pool much larger in diameter than ½ inch and of a height much less than half the original height before becoming set. In the case of this glass, however, the glass cylinder merely bent over sideways as it began to soften and fuse, but it did not lose its essential dimensions of diameter and length, except that a small amount of shrinkage was noted.

In spite of the very low flow of the glasses of the invention under the devitrification sealing conditions, strong bonds are nevertheless made with hard glasses. This is unusual and is advantageous in some applications, as noted.

While the glasses of the invention are particularly suitable for sealing to glass surfaces, they are also useful for sealing other materials having compatible expansion coefficients, such as ceramics and metals.

As will be evident to those skilled in the art, various modifications of this invention can be made or followed in the light of the foregoing disclosure and discussion without departing from the spirit and scope of the disclosure or from the scope of the claims.

I claim:

1. A sealing glass composition that is compatible with materials having expansion coefficients in the neighborhood of $50 \times 10^{-7}$, has a liquidus temperature above 2000° F., a fiber softening point above 600° C. but below 700° C. in the vitreous state, is capable of being thermally devitrified within a period of 1 hour at a temperature in the range from 675–750° C., and consists essentially of 16–18 weight percent PbO, 12–15 weight percent $B_2O_3$, 48–52 weight percent ZnO and 18–20 weight percent $SiO_2$.

2. A glass of claim 1 consisting essentially of about 14 percent $B_2O_3$, 17 percent PbO, 50 percent ZnO and 19 percent $SiO_2$.

References Cited in the file of this patent

UNITED STATES PATENTS

| | | |
|---|---|---|
| 2,889,952 | Claypoole | June 9, 1959 |
| 2,931,142 | Veres | Apr. 5, 1960 |

FOREIGN PATENTS

| | | |
|---|---|---|
| 634,548 | Great Britain | Mar. 22, 1950 |